(12) United States Patent
Karasawa

(10) Patent No.: US 8,179,596 B2
(45) Date of Patent: May 15, 2012

(54) MICROSCOPE SYSTEM AND ITS MAGNIFICATION MODIFYING METHOD

(75) Inventor: Masayoshi Karasawa, Tokyo (JP)

(73) Assignee: Olympus Corporation, Tokyo (JP)

( * ) Notice: Subject to any disclaimer, the term of this patent is extended or adjusted under 35 U.S.C. 154(b) by 397 days.

(21) Appl. No.: 12/475,775

(22) Filed: Jun. 1, 2009

(65) Prior Publication Data

US 2009/0303582 A1 Dec. 10, 2009

(30) Foreign Application Priority Data

Jun. 4, 2008 (JP) ................................. 2008-146573

(51) Int. Cl.
*G02B 21/00* (2006.01)
(52) U.S. Cl. ........................................................ 359/380
(58) Field of Classification Search ........................ None
See application file for complete search history.

(56) References Cited

U.S. PATENT DOCUMENTS

| 6,741,394 B1 | 5/2004 | Tanitsu et al. |
| 2006/0158658 A1 | 7/2006 | Colonna De Lega et al. |

FOREIGN PATENT DOCUMENTS

| EP | 0 841 584 A2 | 5/1998 |
| JP | 5-16006 B2 | 3/1993 |
| JP | 7-248450 A | 9/1995 |
| JP | 2003-029130 A | 1/2003 |

OTHER PUBLICATIONS

Extended European Search Report dated Aug. 30, 2010 (in English) in counterpart European Application No. 09007305.7.

*Primary Examiner* — Derek S Chapel
(74) *Attorney, Agent, or Firm* — Holtz, Holtz, Goodman & Chick, PC

(57) ABSTRACT

A microscope system comprises an objective, an image pickup device, a diameter-variable field stop disposed in a conjugate position with the focal plane of the objective, a magnification modifying device disposed in an optical path between the objective and the image pickup device, for modifying the magnification of the image pickup device and a control unit for controlling in such a way as to maintain a state where a field stop diameter is always larger than a field diameter.

12 Claims, 9 Drawing Sheets

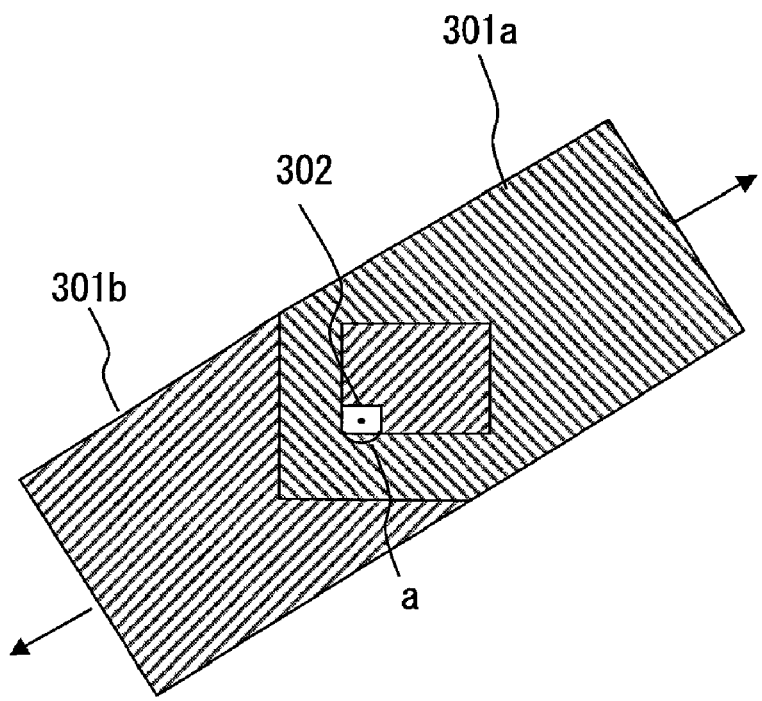
F I G. 3 B

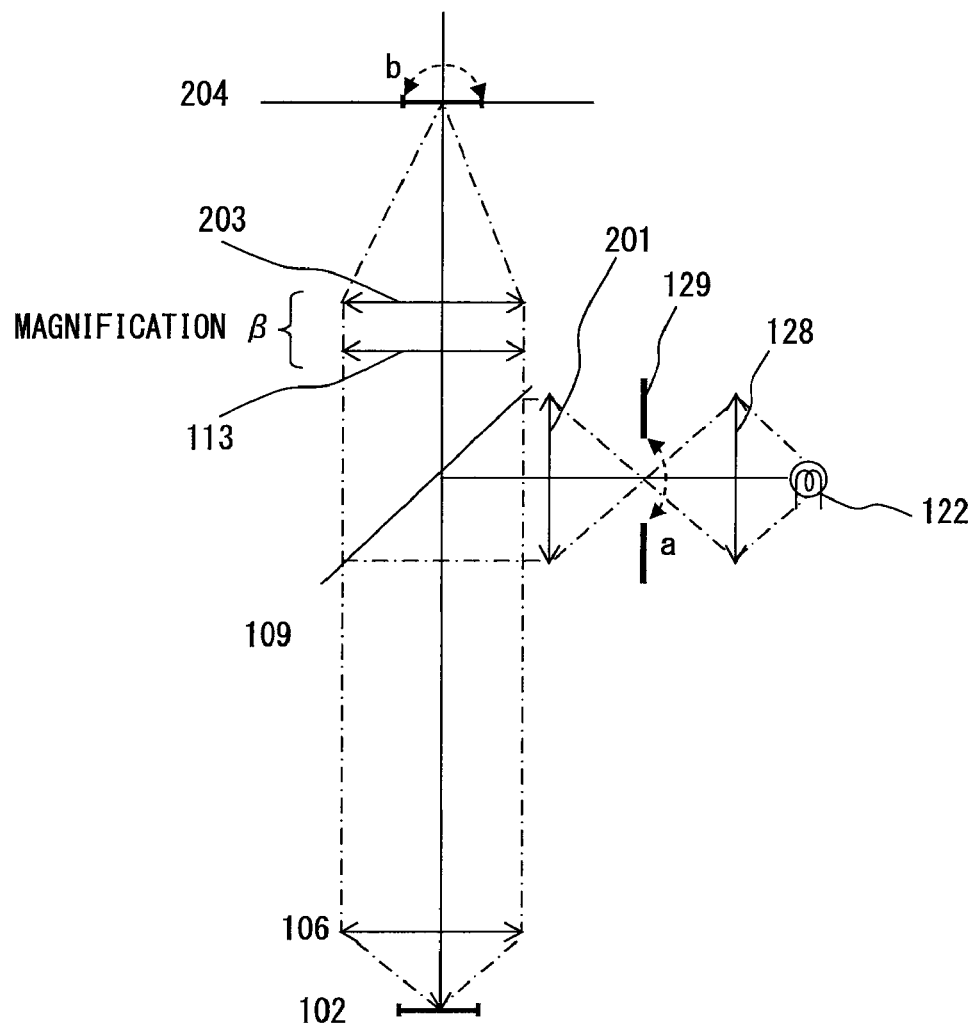
F I G. 4

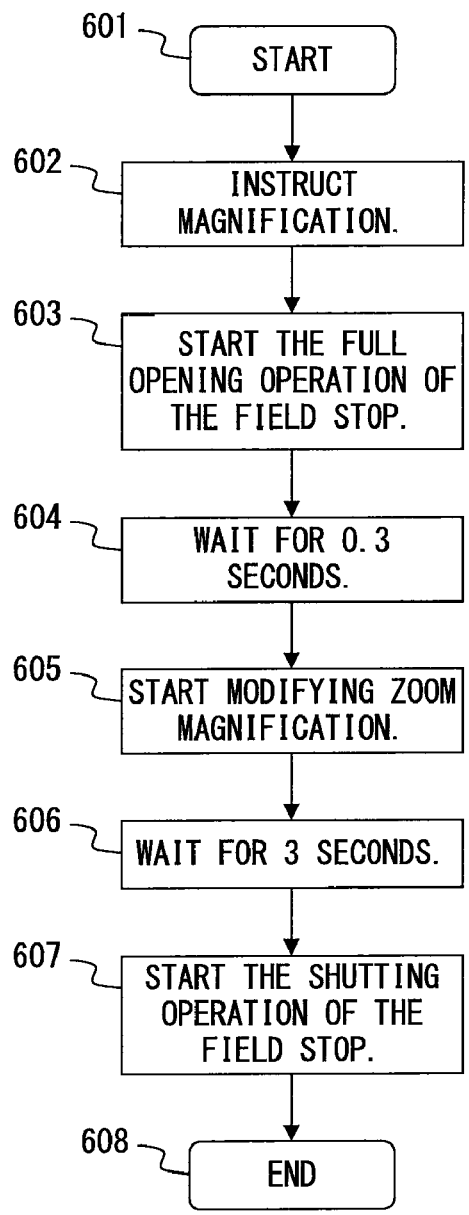
F I G. 7

MICROSCOPE SYSTEM AND ITS MAGNIFICATION MODIFYING METHOD

CROSS REFERENCE TO RELATED APPLICATIONS

This application claims and the benefit of Japanese Patent Application No. 2008-146573 filed Jun. 4, 2008, the contents of which are incorporated by this reference.

BACKGROUND OF THE INVENTION

1. Field of the Invention

The present invention relates to a microscope technology, and more particularly to a technology for modifying the magnification in coaxial epi-illumination.

2. Description of the Related Art

Generally, the optical performance of a microscope depends on the performance of an objective. However, without optimal illumination matched with the performance of an objective, a microscope cannot display its essential performance. Therefore, the illumination device of a microscope is provided with a field stop and an aperture stop, thereby realizing optimal illumination. Especially, if a field stop for controlling an illumination field is narrowed, contrast improves. Therefore, it is important to narrow the field stop to such degree that the vignetting of a field may not occur.

There is a technique for automating such control and automatically controlling illumination light. For example, Japanese Laid-open Patent Publication No. H5-016006 discloses a technique for simplifying the operation of a field stop, an aperture stop, an ND filter and the like.

The magnification modifying method of a microscope includes a turret method, a nose-piece method, a zoom method and the like. The turret method inserts a magnification modifying lens group in an observation optical path by an annular turret provided in the neighborhood of an observation optical path, on which the magnification modifying lens group is mounted. The nose-piece method inserts a magnification modifying lens group in an observation optical path by an objective nose-piece on which a plurality of objectives with different magnification. The zoom method moves a zoom lens group inserted in an observation optical path. In both the turret and nose-piece methods, magnification can be modified by preparing a lens group meeting a purpose in advance. In the zoom method, magnification can be continuously modified within the variable magnification range of a zoom lens group. However, since when magnification is modified, a field range is also modified accordingly, it is necessary to control a field stop according to magnification.

Japanese Laid-open Patent Publication No. H7-248450 discloses a configuration for automating the control of a field stop, an aperture stop accompanying magnification modification by using a display with touch panel and the like. Especially, since when modifying zoom magnification, an observation environment obtained by adjusting a field stop and the like before/after the modification of zoom magnification can be automatically maintained, troublesome operation can be reduced.

The above-described Japanese Laid-open Patent Publication No. H5-116006 defines an optimal stop diameter calculated on the basis of the magnification of an objective and a field diameter. However, this definition does not correspond to zoom magnification modification, intermediate magnification modification and the like. Although the defined equation is applicable to transparent illumination but not applicable to epi-illumination.

The configuration disclosed by Japanese Laid-open Patent Publication No. H7-248450 can maintain an observation environment obtained by adjusting a field stop and the like before/after the modification of zoom magnification. However, during modifying zoom magnification, a field stop blocks part of a field.

SUMMARY OF THE INVENTION

A microscope system in one aspect of the present invention includes an objective, an image pickup device, a field stop disposed in a position conjugate with the focal plane of the objective, whose diameter is variable, a magnification modifying device, disposed in an optical path between the objective and the image pickup device, for modifying the magnification of the image pickup device and a control unit for controlling in such a way as to always maintain the field stop diameter larger than a field diameter which changes accompanying the modification of magnification by the magnification modifying device.

A method for modifying the magnification of a microscope system in another aspect of the present invention includes a first process of fully opening a field stop, a second process for changing magnification after a first waiting time elapses from the first process and a third process of shutting a field stop after a second waiting time elapses from the second process.

A method for modifying the magnification of a microscope system in another aspect of the present invention includes a first process of determining a magnification modifying direction, a second process of delaying one of field diameter changing speed and field diameter changing speed and a third process of simultaneously starting an operation to change a field stop diameter and an operation to change a field diameter.

A method for modifying the magnification of a microscope system in another aspect of the present invention includes a first process of comparing the first field stop diameter changing speed with the second field diameter changing speed by magnification modification, a second process of determining a magnification modifying direction and a third process of starting an operation to change a field stop diameter and an operation to change a field diameter.

BRIEF DESCRIPTION OF THE DRAWINGS

The present invention will be more apparent from the following detailed description when accompanying drawings are referenced.

FIG. 3B is a diagram explaining the driving method of the field stop in the first preferred embodiment (No. 2).

FIG. 4 is a schematic diagram showing an exemplary structure of the optical system of the microscope system in the second preferred embodiment.

FIG. 7 is a flowchart exemplifying the control method in the fourth preferred embodiment.

DESCRIPTION OF THE PREFERRED EMBODIMENTS

The preferred embodiments of the present invention will be explained below with reference to the drawings.

Embodiment 1

Figure 1:
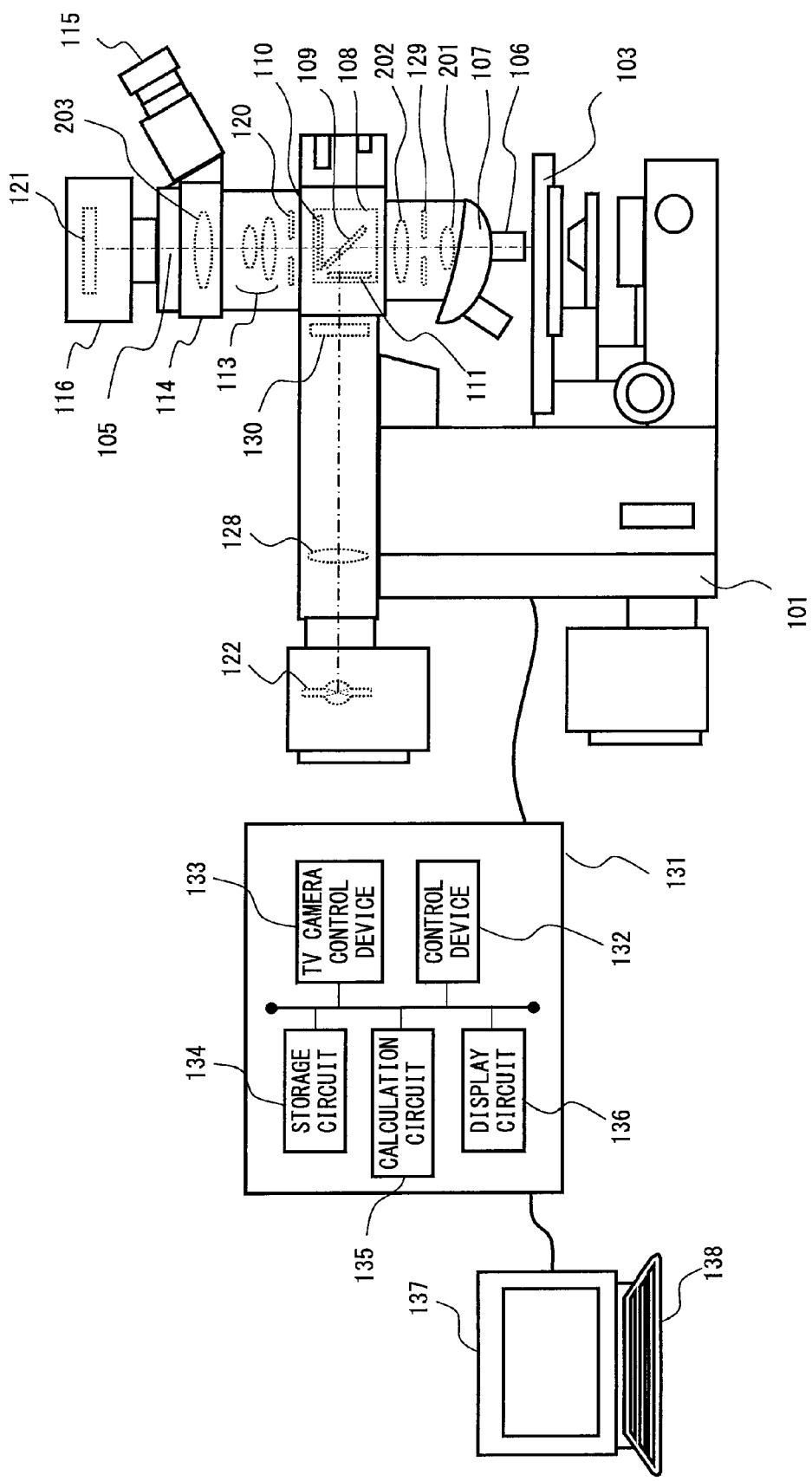
FIG. 1 is a diagram showing a configuration of a microscope system in the first preferred embodiment.

FIG. 1 is a diagram showing a configuration of a microscope system in this embodiment.

The microscope system in this embodiment includes a microscope main body 101. In the microscope main body 101, a specimen with cover glass is fixed on a motorized stage 103 by a specimen holder.

The microscope main body 101 is also provided with a motorized nosepiece 107 and a plurality of objectives 106 is fixed on the motorized nosepiece 107. The motorized nosepiece 107 is provided with a rotatable motorized mechanism (drive unit). The optic axis of an objective 106 overlaps the optic axis 105 of the microscope main body 101 by rotating the motorized nosepiece 107 using the motorized mechanism. Thus, a plurality of objectives 106 fixed on the motorized nosepiece 107 can be switched among them and be used.

The motorized nosepiece 107 is fixed on a motorized focusing unit. The motorized focusing unit can make an objective 106 move along the optic axis 105. In other words, since a specimen is disposed on the motorized stage 103 (and an optic axis 105), the motorized focusing unit can change a relative distance between the objective 106 and the specimen.

Furthermore, it is preferable to provide a transmission illumination device below the specimen on the microscope main body 101 in order to realize critical illumination and Koehler illumination, which is not illustrated in FIG. 1.

A relay lens 201 and a field stop 129 and a relay lens 202 are disposed above the objective 106. Fluorescent filter cubes 108 are disposed further above it.

The relay lens 201 focuses parallel luminous flux emitted from the objective 106 in the position of the field stop 129. In other words, the position of the field stop 129 and the focal plane of the objective 106 has an optical conjugate relationship. Therefore, an observation field and the illumination field of epi-illumination can be adjusted by adjusting the diameter of the field stop 129. In the configuration of this, the field stop 129 is disposed in the common part of an observation optical path and an illumination optical path. Thus, the field stop 129 can simultaneously adjust both an observation field and an illumination field.

The relay lenses 201 and 202 relay the pupil of the objective 106 to the neighborhood of the fluorescent filter cubes 108. Therefore, in the neighborhood of the fluorescent filter cubes 108, the height of an off-axial light beam is suppressed. As a result, the fluorescent filter cubes 108 are used as an optical system with less vignetting.

More particularly, the fluorescent filter cubes 108 comprise a dichroic mirror 109, an absorption filter 110 and an exciter filter 111. There are various combinations of the dichroic mirror 109, the absorption filter 110 and the exciter filter 111. Such a plurality of different combinations of the fluorescent filter cubes 108 can also be made exchangeable by a motorized fluorescent filter cube turret.

The dichroic mirror 109 reflects beams from a light source 122 and leads them to a specimen. Furthermore, the dichroic mirror 109 causes the beams from the specimen to transmit through it and go straight ahead. In FIG. 1, the beams from the light source 122 is curved by 90 degrees by the dichroic mirror 109 and are led to the specimen. The absorption filter 110 is disposed in the optical path of the beams that has transmitted through the dichroic mirror 109. The absorption filter 110 absorbs beams of extra wavelengths from the beams that has transmitted through the dichroic mirror 109. The exciter filter 111 is disposed in the optical path between the light source 122 and the dichroic mirror 109. The exciter filter 111 causes only beams of wavelengths having high excitation efficiency, of the beams from the light source 122 to selectively transmit through it.

Furthermore, the optical path between the light source 122 and the dichroic mirror 109 is provided with a collector lens 128 for converting light emitted from the light source 122 into parallel luminous flux and a fly-eye lens 130 for realizing uniform illumination light. In the configuration of this embodiment, the pupil of the objective 106 is relayed to the neighborhood of the fluorescent filter cubes 108 by the relay lenses 201 and 202. The image of the light source 122 is projected on the fly-eye lens 130 disposed in the neighborhood of the fluorescent filter cubes 108. As a result, the image of the light source 122 is projected in the neighborhood of the pupil of the objective 106. A field stop cannot be disposed on the light source side of the fly-eye lens 130. Therefore, in the configuration of this embodiment, the field stop 129 is disposed between the relay lenses 201 and 202.

A motorized optical zoom unit 113 is disposed above the fluorescent filter cubes 108. A motorized aperture stop 120 is installed in a position almost conjugate with the pupil of the objective 106 inside the motorized optical zoom unit 113.

A tube 114 provided with a tube lens 203 is disposed above the motorized optical zoom unit 113. The tube lens 203 focuses beams emitted from the motorized optical zoom unit 113. Therefore, the image of a specimen 102 is formed in the focal position of the tube lens 203. The tube 114 comprises an optical system for leading an image to an eyepiece lens 115 and an optical system for leading an image to a camera 116 inside.

The camera 116 is disposed above the tube 114. A CCD 121 being an image pickup device is disposed in the camera 116. The CCD 121 converts the enlarged image of a specimen to digital data.

Each drive unit, such as the field stop 129, the motorized optical zoom unit 113 and the like, is connected to a control device (control unit) 132 disposed in a PC 131. Thus, each drive unit is controlled by the control device 132. Specifically, the control device 132 can modify the magnification and a field by controlling the motorized optical zoom unit 113 being a magnification device via the drive unit. Furthermore, the control device 132 can modify the opening diameter of a field stop (hereinafter described as a "field stop diameter") by controlling the field stop via its drive unit.

The camera 116 is connected to a TV camera control device 133. Thus, the TV camera control device 133 controls parameters peculiar to a camera. A digital picture, an instruction to pick up an image and the like are exchanged between the control device 132 and the TV camera control device 133.

A storage circuit (storage unit) 134 and a calculation circuit (calculation unit) 135 are connected to the control device 132. The control device 132 exchanges device data and the like at the time of factory shipment with the storage circuit 134 and performs various types of calculations using such data, the drive position calculation of each device and the like with the calculation circuit 135.

The control device 132 is also connected to a display circuit 136. The control device 132 can also exchange data with an operation unit 138 on which a user actually operates and a monitor 137 by using the display circuit 136.

In this example, a configuration in which the control device 132, the TV camera control device 133, the storage circuit 134, the calculation circuit 135 and the display circuit 136 are disposed in the PC 131 is exemplified. However, the configuration is not especially limited to this. For example, these can be also disposed in a microscope main body instead of a PC. Alternatively, this can be realized by a program executed by a PC, that is, software, instead of physically realizing them.

Although in this example, a CCD is used for an image pickup device, the image pickup device is not especially limited to this. Any image pickup device is passable and a CMOS (complementary metal-oxide semiconductor) or the like can be also used.

Figure 2:
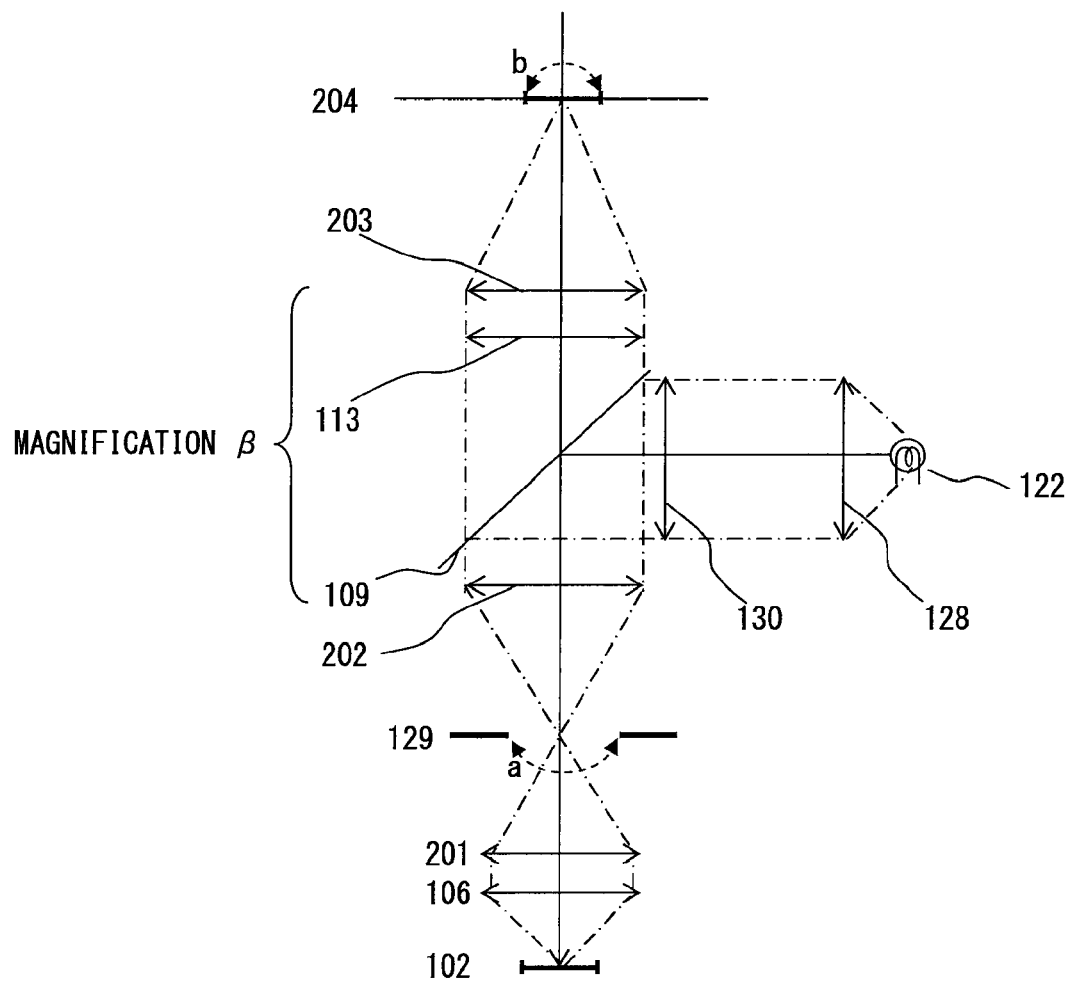
FIG. 2 is a schematic diagram showing an exemplary structure of the optical system of the microscope system illustrated in FIG. 1.

FIG. 2 is the outline of a structure of the optical system of the microscope system illustrated in FIG. 1. In FIG. 2, the same reference numerals are attached to the same components as those in FIG. 1.

Beams from the specimen 102 are enlarged by the objective 106 and are focused on the plane of the field stop 129 by the relay lens 201.

The beams once focused on the plane of the field stop 129 are converted to parallel luminous by the relay lens 202 and are applied to the dichroic mirror 109. The dichroic mirror 109 separates an illumination optical path from the light source 122 from an observation optical path to a CCD plane 204. In this embodiment, beams from the specimen 102 are focused on the plane of the field stop 129 once and transmit through the dichroic mirror 109.

The beams that has transmitted through the dichroic mirror 109 transmits through an absorption filter, which is not illustrated in FIG. 1 and are led to a zoom lens unit 113. Then, the beams are focused on the CCD plane 204 by the tube lens 203.

The illumination optical path up to the dichroic mirror 109 is provided with the light source 122, the collector lens 128 and the fly-eye lens 130. Beams emitted from the light source 122 are converted to parallel luminous flux by the collector lens 128. Then, the fly-eye lens 130 converts the parallel luminous flux in such a way as to realize uniform illumination. This fly-eye lens 130 is disposed in a position almost conjugate with the pupil of the objective 106. Thus, Koeller illumination is realized.

Figure 3A:
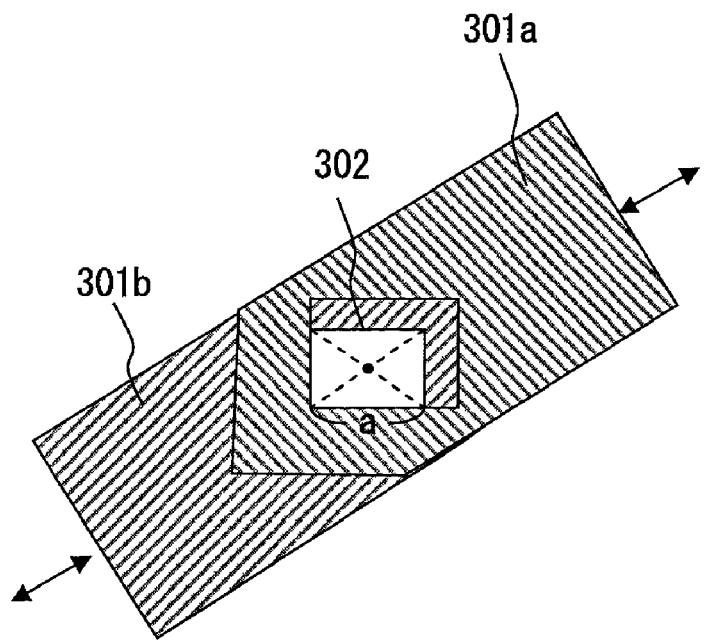
FIG. 3A is a diagram explaining the driving method of the field stop in the first preferred embodiment (No. 1).

FIGS. 3A and 3B explain the summary of the driving method of the field stop 129 in the embodiment 1. As illustrated in FIGS. 3A and 3B, the field stop 129 of this embodiment comprises two blades 301a and 301b. The field stop 129 further comprises a drive unit, which is not illustrated in FIGS. 3A and 3B. This drive unit is electrically controlled. More particularly, the drive unit is controlled by the control device 132.

Each of the two blades 301a and 301b is provided with a rectangular opening. A new rectangular opening 302 is formed in the position where the respective rectangular openings overlap. The rectangular opening 302 is structured in such a way that the center of the rectangular opening 302 overlaps the axis 105 of the microscope main body 101. The rectangular opening 302 is also structured in such a way that the long side direction of the rectangular opening 302 coincides with the long side direction of the CCD plane 204. The rectangular opening 302 is also structured in such a way that the ratio between the length of the long side and the length of the short side of the rectangular opening 302 coincides with the ratio between the length of the long side and the length of the short side of the CCD plane 204.

The two blades 301a and 301b are jointly operated by the drive unit, which is not illustrated in FIG. 3. In this case, the drive unit is provided with a normal drive mechanism, such as a cam, a gear or the like and is driven by a power, such as a motor or the like. The size of the rectangular opening 302 can be changed without causing the center of the rectangular opening 302 and an optic axis 105 to deviate from each other since the respective two blades 301a and 301b operate in the opposite diagnostic directions of the rectangular opening 302 by equal amount.

If the length of the long side of the rectangular opening and the length of the long side of the CCD plane 204 are assumed to be a [mm] and b [mm], respectively, the optimal relationship of both is determined by zoom magnification β. The relationship is expressed as follows.

$$a = b/\beta \times k \quad (1)$$

In this case, the zoom magnification β indicates comprehensive magnification between the field stop 129 and the CCD plane 204 and does not indicate the magnification of the motorized optical zoom unit 113 itself. k in the above-described relationship equation (1) is a correction coefficient. The correction coefficient k is set in such a way that part of a field is not blocked by the field stop entering into a field and blocking it. More specifically, this correction coefficient k is set to a numeric value satisfying $1 < k \leq 1.5$. By reducing this value, the contrast of an observation image and the like can be improved or the fading range of a specimen, due to epi-illumination of high intensity can be limited.

In the case of visual observation by an eyepiece lens instead of camera photographing, the above-described equation can be similarly utilized by replacing the length of the long side of a CCD light receiving plane with field number of an eyepiece lens.

Embodiment 2

FIG. 4 is the outline of a structure of the optical system of the microscope system in the embodiment 2 and illustrates a case where the position of the field stop 129 is modified on the light source side of the dichroic mirror 109 from the configuration of the optical system illustrated in FIG. 2.

In this embodiment, illumination light from the light source 122 is converted to almost parallel luminous flux by the collector lens 128. The illumination light converted to almost parallel luminous flux is applied to the field stop 129. Then, the illumination light is led to the relay lens 201 after its luminous flux diameter is restricted to an appropriate length. This relay lens 201 is sometimes called a field lens. This relay lens 201 projects the image of the light source 122 in the pupil position of the objective lens 106 functioning together with the collector lens 128. The relay lens 201 also projects the field stop 129 on the surface of the specimen 102 functioning together with the objective lens 106.

The structure of the field stop 129 in this embodiment is the same as that in the embodiment 1 and the summary of its driving method is as described above in FIGS. 3A and 3B. Therefore, its explanation is omitted here.

Observation light from the specimen 102 is converted to parallel light by the objective 106 and transmits through the dichroic mirror 109. Furthermore, the observation light is enlarged by the motorized optical zoom unit 113 and is focused on the CCD plane 204 by the tube lens 203.

The optimal relationship between the long side a[mm] of the rectangular opening 302 and the long side b[mm] of the CCD plane 204 in this embodiment is expressed by the following relationship equation.

$$a = (b/(\beta \times \gamma)) \times k \quad (2)$$

In the above-described equation, β and γ indicate zoom magnification and the magnification of the relay lens 201, respectively. k is a correction coefficient and is set to a numeric value satisfying 1<k≦1.5 as in the embodiment 1.

Embodiment 3

Next, the control method of the size of a field stop will be described.

Figure 5:
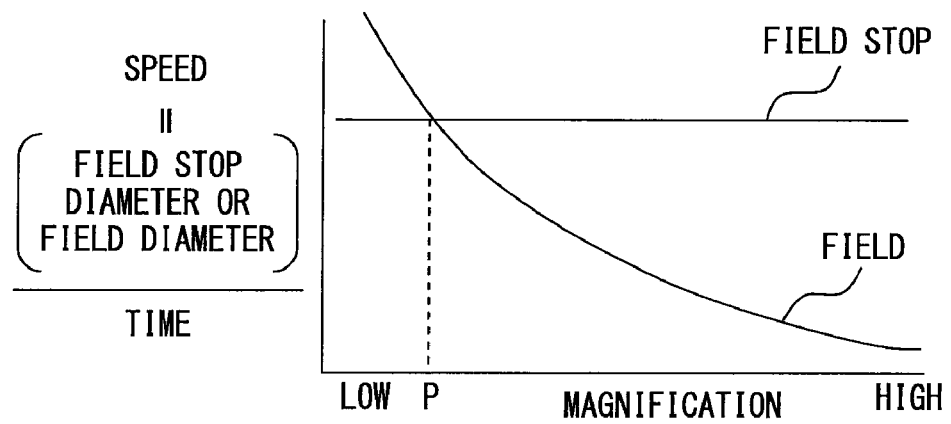
FIG. 5 is a diagram showing an exemplary relationship between zoom magnification modifying speed and field stop diameter changing speed.

FIG. 5 exemplifies the changing speed of a field and a field stop in zoom magnification. FIG. 5 exemplifies a case where field stop changing "speed" does not depend on zoom "magnification", while field changing "speed" depends on zoom "magnification". Specifically, field changing speed depends on magnification changing speed. Field changing "speed" is field diameter changing speed (hereinafter described as "field diameter speed") and is indicated by the amount of change of a field diameter per unit time. Field stop changing "speed" is field stop diameter changing "speed" (hereinafter described as "field stop diameter speed") and is indicated by the amount of change of a field stop diameter per unit time.

In zoom magnification, generally magnification is changed in geometric progression in such a way that a sense of incompatibility is not felt against magnification changing speed (that is, field diameter speed). More particularly, the lower is magnification, the faster magnification changes and the faster filed diameter changes. Therefore, at the time of low magnification, a state where the change of a field stop diameter cannot catch up with the change of a field diameter due to the change of magnification sometimes occurs. In this case, the field stop diameter becomes smaller than the field diameter and a field stop enters into in a field and blocks it in the midst of zoom magnification.

The more a field stop is narrowed, the more the contrast of an image is improved. Therefore, it is preferable to control in such a way that a field stop diameter always becomes larger than a field diameter while controlling in such a way that the field stop diameter becomes as small as possible.

This fact will be explained using zoom magnification in the vicinity of the lowest zoom magnification as an example. As exemplified in FIG. 5, in the vicinity of the lowest zoom magnification, the field diameter speed due to zoom magnification is higher than field stop diameter speed. In this case, at the rising time of magnification, since a field diameter decreases faster than a field stop diameter, a field stop never blocks a field. However, at the falling time of magnification, since a field diameter increases faster than a field stop diameter, in an environment where a field stop diameter is initially set a little larger than a field diameter, the field diameter becomes larger than the field stop diameter. As a result, the field stop blocks the field.

Figure 6:
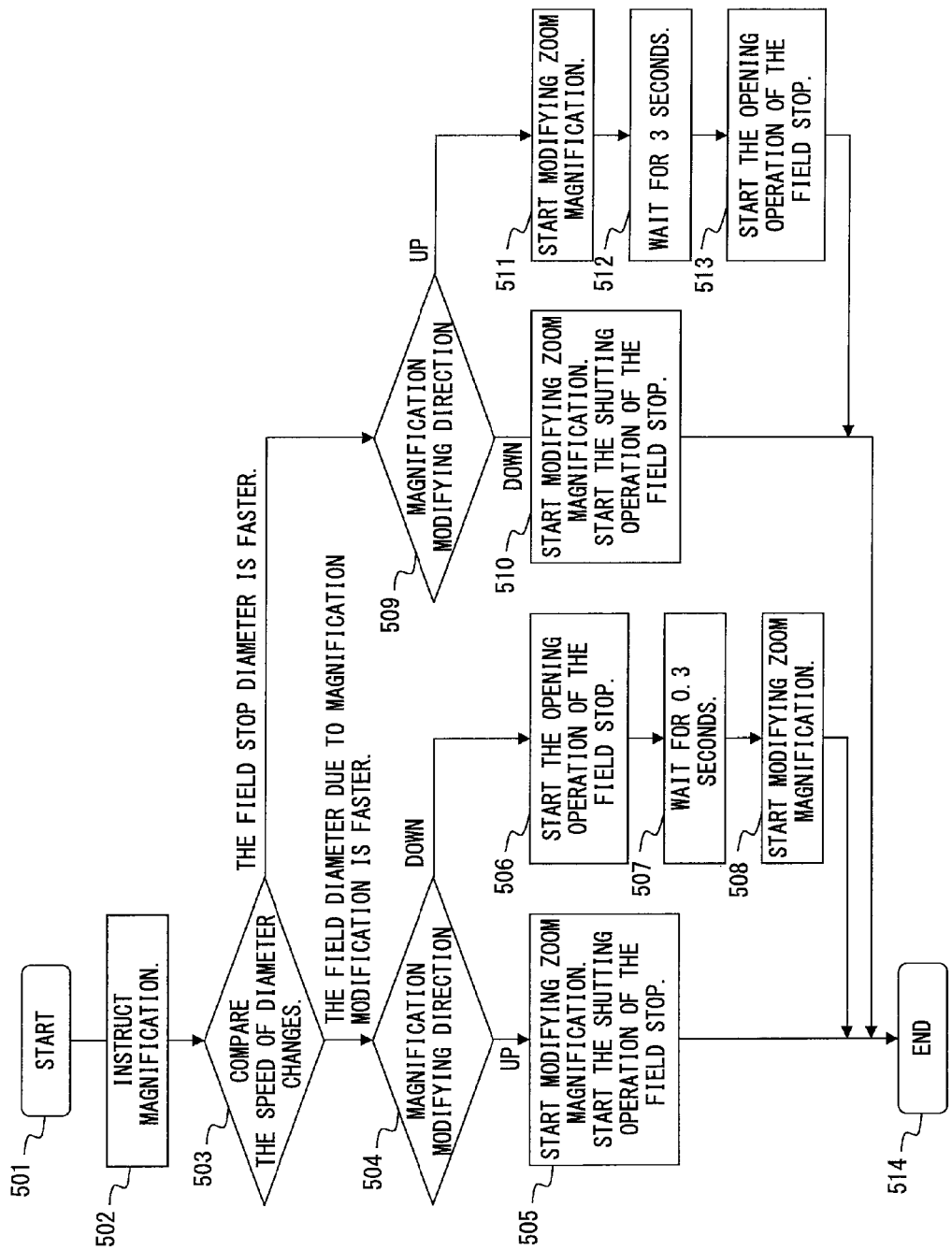
FIG. 6 is a flowchart exemplifying zoom magnification modification and the control of a field stop in the third preferred embodiment.

FIG. 6 is a flowchart exemplifying zoom magnification modification and the control of a field stop in this embodiment. FIG. 6 exemplifies control for suppressing the occurrence of a state where a field stop blocks a field.

Firstly, in step 501, the control is started. In step 502 an instruction to modify magnification is inputted to the control device 132 in response of the magnification modifying request of a user. A user instructs the magnification modification using the keyboard 138, a mouse or the like while referring to GUI displayed on the monitor screen 137 in the embodiment 1. Alternatively, the magnification modifying request can be also inputted using a touch panel or the like.

Then, in step 503 field stop diameter speed and field diameter speed are compared and it is determined which of them is higher. The microscope system in this embodiment is provided in advance with data as exemplified in FIG. 5. Magnification at the instruction time of magnification modification in step 502, that is, in magnification before modification, field stop diameter speed and field diameter speed due to magnification modification are compared. In the case of the data exemplified in FIG. 5, it is determined whether it is higher than magnification indicated by P. The data exemplified in FIG. 5 is stored in the storage circuit 134 in the embodiment 1. In this case, it is more preferable to also compare it with magnification instructed by a magnification modifying request, that is, magnification after modification.

This is performed by a comparison unit. The comparison unit can be the calculation circuit 135 exemplified in FIG. 1 or be included in the control device 132. Alternatively, it can be provided separately from these.

If it is determined that field diameter speed is higher, then, the control advances to step 504. In step 504, it is determined which the magnification modifying request in step 502 is, an "UP" instruction to increase magnification or a "DOWN" instruction to reduce magnification. For this determination, a difference between the current magnification and magnification at the instruction time of magnification modification is used.

If it is determined that it is an "UP" instruction, the control advances to step 505 and both an operation to modify zoom magnification and an operation to shut a field stop are simultaneously started. As described earlier, since in this state, zoom magnifying modification (that is, the change of a field diameter) is faster, the vignetting of a field never occur. After this operation, the control advances to step 514. In this case, the reduced amount of a field stop diameter by an operation to shut a field stop is calculated by the calculation circuit 135 exemplified in FIG. 1, using the relationship equation (1). Both the operation to modify zoom magnification and the operation to shut a field stop are controlled by the control device 132 exemplified in FIG. 1.

If in step 504 it is determined that it is a "DOWN" instruction, the control advances to step 506 and an operation to open a field stop is started. Then, the control waits for 0.3 seconds after the operation to open a field stop is started (see step 507). This waiting time of 0.3 seconds are used to prevent the operation to modify zoom magnification from catching up with the field stop operation and is set in accordance with the microscope system in this embodiment. Therefore, the waiting time is not limited to 0.3 seconds and can be optimized for each microscope system. The waiting time also varies depending on the correction coefficient k of the relationship equation (1). Then, in step 508 an operation to modify zoom magnification is started. The control further advances to step 514 and is terminated.

If in step 503 it is determined that the field stop diameter speed is higher, the control advances to step 509. In step 509 it is determined which the magnification modifying request in step 502 is, an "UP" instruction to increase magnification or a "DOWN" instruction to reduce magnification. If it is determined that it is a "DOWN" instruction, the control advances to step 510 and an operation to modify zoom magnification and an operation to shut field stop are simultaneously started. After this operation, the control advances to step 514 and is terminated.

If in step 509 it is determined that it is an "UP" instruction, the control advances to step 511 and an operation to modify zoom magnification is started. Then, the control waits for 3 seconds after the operation to modify zoom magnification is started (see step 512). This waiting time of 3 seconds are used to prevent the operation to modify zoom magnification from catching up with the field stop operation and is set in accordance with the microscope system in this embodiment. Therefore, the waiting time is not limited to 3 seconds and can be optimized for each microscope system. Then, the control advances to step 513 and an operation to open a field stop is started. The control further advances to step 514 and is terminated.

When in step 503 field stop diameter speed and field diameter speed due to magnification modification are compared, magnification (magnification P) in the intersection of two curves exemplified in FIG. 5 is sometimes located between magnification at the instruction time of magnification modification (that is, magnification before modification) and instructed magnification (that is, magnification after modification). In this case, the operation can be stopped once in a place where magnification exceeds magnification P a little and the control can be started from step 503 again.

If in step 503 it is determined that field stop diameter speed and field diameter speed due to magnification modification are the same, an operation to modify zoom magnification and an operation to shut a field stop can be simultaneously started regardless of an instruction to modify magnification.

Thus, the blades neither enter into a field nor block it in the midst of the operation to modify magnification. Therefore, this never gives uneasiness to a user. Furthermore, a field stop can be shut up to a state where a field atop diameter is equal to or a little larger than a field diameter. This corresponds to approaching the correction coefficient k of the relationship equation (1) to "1" as much as possible. Thus, unnecessary beams that enter a CCD plane from others than a specimen can be eliminated. Thus, optical performance that can be evaluated using the contrast of an observation image or the like can be improved. Furthermore, since the range of illumination light applied to a specimen can be narrowed up to the same range as a field, in fluorescent observation by epi-illumination, the fading range of a specimen can be suppressed to the minimum level.

Embodiment 4

In the case of the control method in the embodiment 3, it is necessary to determine which is an instruction to modify magnification is an "UP" or "DOWN" instruction. Furthermore, the instruction to modify magnification is not limited to the earlier-described instruction to modify zoom magnification and many instructions, such as an instruction to modify magnification in a turret method in which a magnification modifying lens is switched and is inserted in an observation optical path, an instruction to modify magnification in a nosepiece method in which an objective lens is switched and the like, can exist. Furthermore, these many instructions to modify magnification are not always issued independently. There is also an instruction to modify comprehensive magnification by combining a plurality of magnification modifying methods and in that case, the process is complicated.

Therefore, in this embodiment, the comparison in speed between a field diameter and a field stop diameter (see step 503 illustrated in FIG. 6), the determination on which is an instruction to modify magnification is an "UP" or "DOWN" instruction (see step 504 illustrated in FIG. 6) are not performed. Instead, it is controlled in such a way that an operation to modify magnification is started after a field stop is fully opened. Generally, the operation time of a field stop is sufficiently shorter than the operation time of a zoom lens. Therefore, even when the control method of this embodiment is used, a time necessary for the control does not greatly differ from a time necessary for the control in the embodiment 3.

FIG. 7 is a flowchart exemplifying the control method in the embodiment 4.

Firstly, in step 601 the control is started. When an instruction to modify magnification is inputted (see step 602), the control advances to step 603 and an operation to fully open a field stop is started. Then, the control waits for only a first waiting time after the operation to fully open a field stop is started (see step 604). Although in this case, the first waiting time is 0.3 seconds, the first waiting time is not limited to 0.3 seconds. It is OK if the first waiting time is a time needed for a field stop to move up to a state where a field stop is opened sufficiently not to block a field and is set for each microscope system.

Then, in step 605, an operation to modify zoom magnification is started. Furthermore, after the start of the operation to modify zoom magnification, the control waits for only a second waiting time (see step 606). In this case, the second waiting time is 3 seconds. This second waiting time is also optimized and set for each microscope system. Lastly, in step 607 an operation to shut a field stop is started. A field stop is shut by the amount calculated using the relationship equation (1). Then, the control advances to step 608 and is terminated.

In this embodiment, the control is simplified compared with the embodiment 3. Thus, the number of steps of a program code and bugs decreases. Thus, since the number of test man-hours is reduced, a time needed to generate a program is shortened. The blades of a field stop neither enter into a field nor block it in the midst of the operation to modify magnification. Thus, uneasiness is never given to a user. Furthermore, a field stop can be shut up to a state where a field stop diameter is equal to or a little greater than a field diameter. This corresponds to approaching the correction coefficient k of the relationship equation (1) to "1" as much as possible. Thus, unnecessary beams that enter a CCD plane from others than a specimen can be eliminated. As a result, optical performance that can be evaluated using the contrast of an observation image or the like can be improved. Furthermore, since the range of illumination light applied to a specimen can be narrowed up to the same range as a field, in fluorescent observation by epi-illumination, the fading range of a specimen can be suppressed to the minimum level.

Embodiment 5

Figure 8:
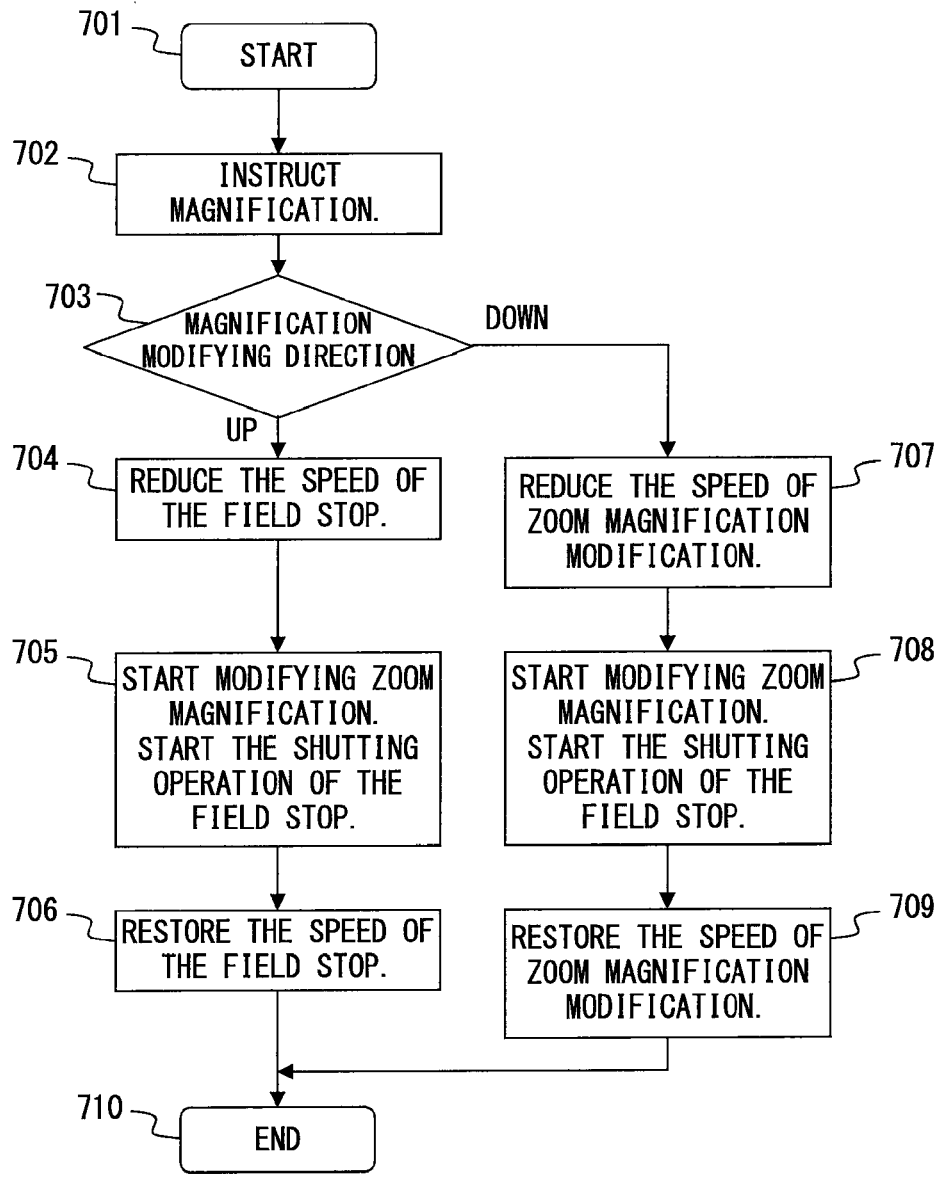
FIG. 8 is a flowchart illustrating the control method in the fifth preferred embodiment.

FIG. 8 is a flowchart illustrating the control method in the embodiment 5.

Firstly, in step 701, the control is started. Then, in step 702 the instruction to modify magnification of a user is received. In step 703 the direction of magnification modification is determined according to this instruction. If the direction of magnification modification is "UP", the control advances to step 704 and the operation speed of a field stop is reduced. The speed after reduction is sufficiently lower than the field diameter speed due to zoom magnification modification. This speed after reduction is optimized for each microscope system. Then, in step 705, an operation to modify zoom magnification and an operation to shut a field stop are simultaneously started and a field stop diameter is changed in accordance with magnification. Lastly, in step 706 the field stop speed is restored and in step 710 the control is terminated.

If the direction of magnification modification is "DOWN", in step 707 the speed of the operation to modify zoom magnification is reduced. Although in the microscope system of this embodiment, a maximum time needed to modify zoom magnification (that is, a transition time from maximum magnification to minimum magnification) is approximately 3 seconds, this is increased to approximately 5 seconds. Speed after reduction varies depending on a microscope system. Then, in step 708 an operation to modify zoom magnification and an operation to shut a field stop are simultaneously started and the field stop diameter is changed to the field stop diameter corresponding to magnification. Lastly, in step 709 the field speed due to zoom magnification modification is restored (for example, the transition time is 3 seconds) and in step 710 the control is terminated.

In this embodiment too, the blades of a field stop neither enter into a field nor block it in the midst of the operation to modify magnification. Thus, uneasiness is never given to a user. Furthermore, a field stop can be shut up to a state where a field stop diameter is equal to or a little greater than a field diameter. This corresponds to approaching the correction coefficient k of the relationship equation (1) to "1" as much as possible. Thus, unnecessary beams that enter a CCD plane from others than a specimen can be eliminated. As a result, optical performance that can be evaluated using the contrast of an observation image or the like can be improved. Furthermore, since the range of illumination light applied to a specimen can be narrowed up to the same range as a field, in fluorescent observation by epi-illumination, the fading range of a specimen can be suppressed to the minimum level.

The following technical concepts are led from each of the above-described embodiments.

(Candidate Claim 1) A method for modifying the observation magnification of a microscope, in which the microscope comprises an objective, a diameter-variable field stop disposed in a conjugate position with the focal plane of the objective, a magnification modifying device disposed in an observation optical path between the objective and an image pickup device and a control device for controlling the field stop and the magnification modifying device, wherein the control device controls in such a way as to maintain a state where a field stop diameter is always larger than a field diameter changed by the magnification modifying device.

(Candidate Claim 2) The magnification modifying method according to candidate claim 1, wherein the control device starts a drive for fully opening the field stop, causes a first waiting time to elapse after the starting time of the drive for fully opening the field stop, starts the drive of the magnification modifying device, causes a second waiting time to elapse after the starting time of the drive of the magnification modifying device, and starts a drive for shutting the field stop.

(Candidate Claim 3) The magnification modifying method according to candidate claim 2, wherein the first waiting time is shorter than the second waiting time.

(Candidate Claim 4) The magnification modifying method according to candidate claim 1, further comprising a comparison step for comparing the changing speed of the diameter of the field stop with the changing speed of the field diameter, wherein it is determined which drive of either the magnification device or the field stop is started first.

(Candidate Claim 5) The magnification modifying method according to candidate claim 4, wherein when as a result of the comparison step, it is determined that the changing speed of the field stop is higher, at the falling time of magnification both the magnification device and the field stop are simultaneously driven to start.

(Candidate Claim 6) The magnification modifying method according to candidate claim 4, wherein when as a result of the comparison step, it is determined that the changing speed of the field is higher, at the rising time of magnification both the magnification device and the field stop are simultaneously driven to start.

(Candidate Claim 7) The magnification modifying method according to candidate claim 1, further comprising a first speed reduction step of reducing the drive speed of the field stop and a second speed reduction step of reducing the drive speed of the magnification modifying device, wherein at the rising time of magnification the first speed reduction step is executed and at the falling time of magnification the second speed reduction step is executed.

What is claimed is:

1. A microscope system, comprising:
an objective;
an image pickup device;
a diameter-variable field stop disposed in a conjugate position with a focal plane of the objective;
a magnification modifying device disposed in an observation optical path between the objective and the image pickup device; and
a control unit for controlling in such a way as to maintain a state where a field stop diameter of the field stop is always larger than a field diameter which changes accompanying a modification of magnification by the magnification modifying device.

2. The microscope system according to claim 1, wherein the control unit
controls the field stop diameter by controlling the field stop and
controls the magnification and the field diameter by controlling the magnification modifying device.

3. The microscope system according to claim 1, wherein the control unit
starts a first operation for fully opening the field stop,
starts a second operation for changing the magnification by the magnification modifying device after a first waiting time elapses after a start of the first operation, and
starts a third operation for shutting the field stop after a second waiting time elapses after a start of the second operation.

4. The microscope system according to claim 3, wherein the first waiting time is shorter than the second waiting time.

5. The microscope system according to claim 1, further comprising
a comparison unit for comparing first speed at which the field stop diameter changes with second speed at which the field diameter changes due to a modification of magnification by the magnification modifying device, wherein
when magnification is modified by the magnification modifying device, the comparison unit determines operation starting order of the magnification modifying device and the field stop.

6. The microscope system according to claim 5, wherein the comparison unit is included in the control unit.

7. The microscope system according to claim 5, wherein when magnification is increased by the magnification modifying device,
the comparison unit
starts operation of the magnification modifying device and then operation of the field stop if the first speed is higher than the second speed, and
simultaneously starts operations of the magnification modifying device and the field stop if the first speed is equal to or lower than the second speed.

8. The microscope system according to claim 5, wherein when magnification is reduced by the magnification modifying device,
the comparison unit
simultaneously starts operations of the magnification modifying device and the field stop if the first speed is equal to or higher than the second speed, and starts operation of the field stop and then operation of the magnification modifying device if the first speed is lower than the second speed.

9. The microscope system according to claim 1, wherein when magnification is increased by the magnification modifying device, the control unit starts operations of the field stop and the magnification modifying device after reducing speed of the field stop.

10. The microscope system according to claim 1, wherein when magnification is reduced by the magnification modifying device, the control unit starts operations of the field stop and the magnification modifying device after reducing speed of the magnification modifying device.

11. The microscope system according to claim 1, wherein when a, b, β and k are length of a long side of an opening of the field stop, length of a long side of the image pickup device, comprehensive magnification from the field stop to the image pickup device and a correction coefficient, respectively, the following condition equation is satisfied $$a=(b/\beta)\times k$$

$$1<k\leq 1.5.$$

12. The microscope system according to claim 1, further comprising:

a storage unit for storing data peculiar to the microscope system in advance; and a calculation unit, wherein the control unit causes the storage unit and the calculation unit to transmit and receive data between them.

* * * * *